(12) United States Patent
Yeluri et al.

(10) Patent No.: US 7,224,691 B1
(45) Date of Patent: May 29, 2007

(54) FLOW CONTROL SYSTEMS AND METHODS FOR MULTI-LEVEL BUFFERING SCHEMES

(75) Inventors: Sharada Yeluri, San Jose, CA (US); Raymond Scott Chan, Mountain View, CA (US); Shahriar Ilislamloo, Monte Sereno, CA (US); Varkey Alapat, Sunnyvale, CA (US); Shunn-Cheng Jang, Milpitas, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1052 days.

(21) Appl. No.: 10/241,759

(22) Filed: Sep. 12, 2002

(51) Int. Cl.
*H04L 12/54* (2006.01)
(52) U.S. Cl. ...................... 370/394; 370/412
(58) Field of Classification Search ............. 370/229, 370/236, 363, 373, 374, 476, 412, 413, 414, 370/419, 429, 394
See application file for complete search history.

(56) References Cited

U.S. PATENT DOCUMENTS 6,219,339 B1 * 4/2001 Doshi et al. ............... 370/235
6,259,699 B1 * 7/2001 Opalka et al. ............. 370/398
6,735,203 B1 * 5/2004 Heiman ..................... 370/394
7,058,070 B2 * 6/2006 Tran et al. ................. 370/412

\* cited by examiner

*Primary Examiner*—Hassan Kizou
*Assistant Examiner*—Brian T. O'Connor
(74) *Attorney, Agent, or Firm*—Harrity Snyder, LLP (57) ABSTRACT

A system receives data in multiple streams from an upstream device. The system temporarily stores the data in a first buffer and asserts a forward flow control signal when a capacity of the first buffer exceeds a first threshold value. The system reads the data from the first buffer and selectively processes the data based on the forward flow control signal. The system temporarily stores the selectively processed data in a number of second buffers, generates a backward flow control signal when a capacity of one of the second buffers exceeds a second threshold value, and sends the backward flow control signal to the upstream device.

28 Claims, 9 Drawing Sheets

FLOW CONTROL SYSTEMS AND METHODS FOR MULTI-LEVEL BUFFERING SCHEMES

BACKGROUND OF THE INVENTION

1. Field of the Invention

The present invention relates generally to data transfer and, more particularly, to systems and methods for improving traffic flow.

2. Description of Related Art

Network devices, such as routers, receive data on physical media, such as optical fiber, analyze the data to determine its destination, and output the data on physical media in accordance with the destination. Routers were initially designed using a general purpose processor executing large software programs. As line rates and traffic volume increased, however, general purpose processors could not scale to meet the new demands. For example, as new functions, such as accounting and policing functionality, were added to the software, these routers suffered performance degradation. In some instances, the routers failed to handle traffic at line rate when the new functionality was added.

To meet the new demands, purpose-built routers were designed. Purpose-built routers are designed and built with components optimized for routing. They not only handle higher line rates and higher network traffic volume, but they also add functionality without compromising line rate performance.

A conventional purpose-built router may include a number of input and output ports from which it receives and transmits streams of data packets. A switching fabric may be implemented in the router to carry the packets between the ports. In a high-performance purpose-built router, the switching fabric may transmit a large amount of data between a number of internal components.

The ports of a conventional router may be configured to handle multiple packet streams. To facilitate this, the ports may include a high speed interface with a wide internal data path, such as a PL4 (Packet-Over-SONET (POS) Physical Layer (PHY) Level 4) interface, which is 16 bits wide and operates at 700 MHz. For multi-stream applications, the bandwidth is dynamically shared on the data path by time multiplexing the streams. It is possible, however, for individual streams to transmit bursts that consume the full available bandwidth for some duration of time. This makes the input buffering problem for multi-stream applications difficult.

If part of the data path, such as a queue or a first-in first-out (FIFO) memory, receives more traffic than it can handle, it asserts a flow control signal upstream. The flow control signal instructs the upstream device to stop transmitting data. The device asserting the flow control usually includes a FIFO or buffer large enough to absorb all of the data already in transit from the upstream device, since there is a latency between the time flow control is asserted and the time the upstream device stops sending new data.

Conventional routers may include a single unified FIFO that receives the time-multiplexed data from the data path. In some circumstances, the FIFO may begin to fill up due to excess traffic on a single stream. In this case, the FIFO may assert flow control. When this happens, all traffic to the FIFO is stopped—including traffic on other streams. This causes all other streams to starve for a lack of data, even though the real traffic backup is only on a single stream. This is called head-of-line blocking.

As a result, there is a need for systems and methods that provide buffering and flow control schemes that address head-of-line blocking and other flow control problems that may occur in multi-stream applications.

SUMMARY OF THE INVENTION

Systems and methods consistent with the principles of the invention address this and other needs by providing a multi-level buffering scheme to handle large amounts of buffering per stream and forward and backward flow control to improve traffic flow.

One aspect consistent with the principles of the invention includes a system that receives data in multiple streams from an upstream device. The system temporarily stores the data in a first buffer and asserts a forward flow control signal when a capacity of the first buffer exceeds a first threshold value. The system reads the data from the first buffer and selectively processes the data based on the forward flow control signal. The system temporarily stores the selectively processed data in a number of second buffers, generates a backward flow control signal when a capacity of one of the second buffers exceeds a second threshold value, and sends the backward flow control signal to the upstream device.

In another aspect of the invention, a network device includes multiple forwarding engines coupled to a switch fabric. Each of the forwarding engines is configured to receive packet data in multiples streams, temporarily store the packet data in a first buffer, and assert a forward flow control signal when a capacity of the first buffer exceeds a threshold value. The forwarding engine is further configured to read the packet data from the first buffer, selectively process the packet data based on the forward flow control signal, and temporarily store the selectively processed packet data in multiple second buffers.

In a further aspect of the invention, a device that receives data in multiple streams is provided. The device includes a first buffer, logic blocks that correspond to the streams, and second buffers corresponding to the logic blocks. The first buffer stores the data at a first rate and asserts a forward flow control signal when a capacity of the first buffer exceeds a threshold value. The logic blocks read the data from the first buffer at a second rate and selectively process the data based on the forward flow control signal. The second buffers temporarily store the data from the logic blocks.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with principles of the invention provide a multi-level buffering scheme to handle large amounts of buffering in a multi-stream environment. The systems and methods also provide forward and backward flow control to improve traffic flow and prevent head-of-line blocking.

System Configuration

Figure 1:
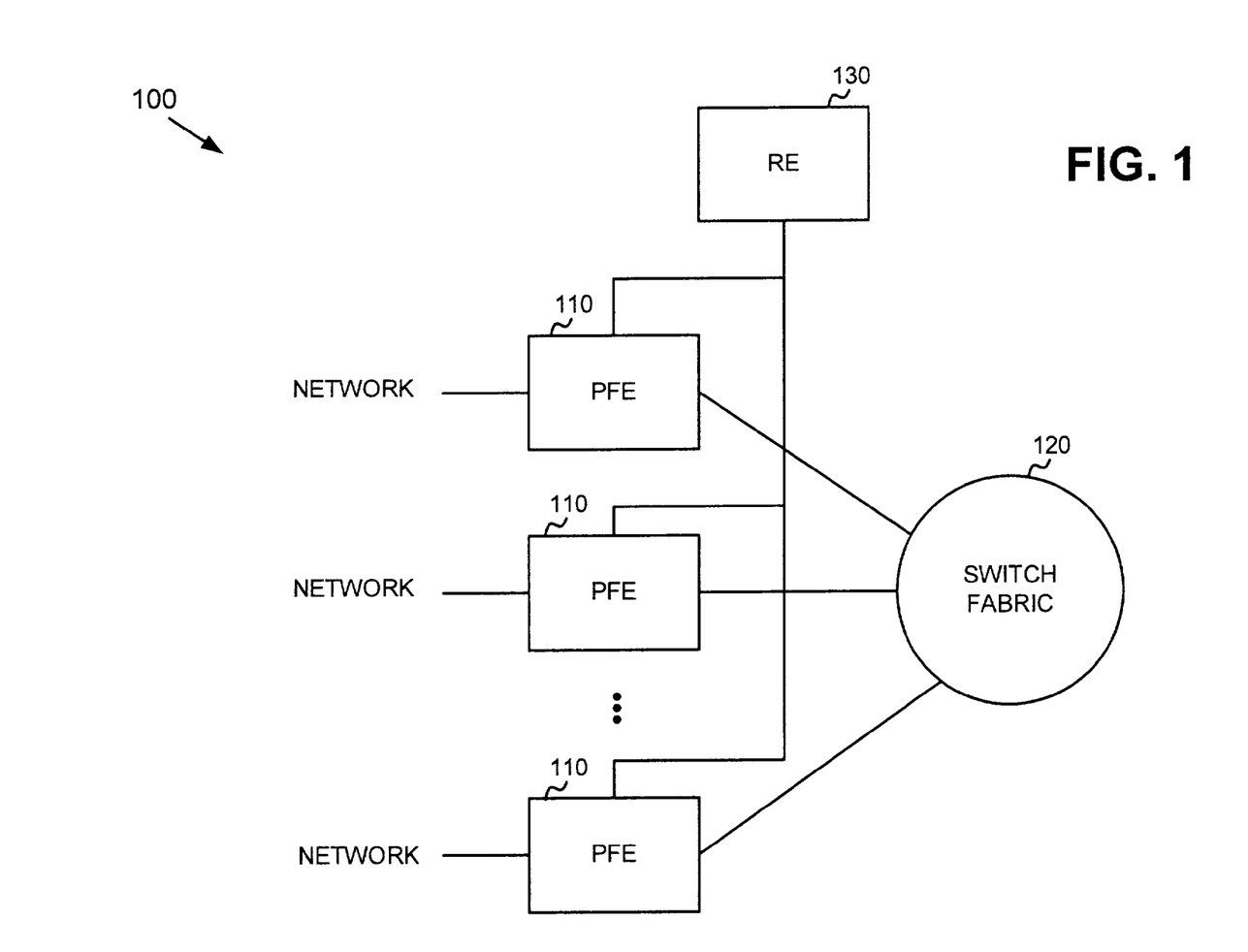
FIG. 1 is a block diagram illustrating an exemplary routing system in which systems and methods consistent with principles of the invention may be implemented.

FIG. 1 is a block diagram illustrating an exemplary routing system 100 in which systems and methods consistent with the principles of the invention may be implemented. System 100 receives one or more packet streams from physical links, processes the packet stream(s) to determine destination information, and transmits the packet stream(s) out on links in accordance with the destination information. System 100 may include packet forwarding engines (PFEs) 110, a switch fabric 120, and a routing engine (RE) 130.

RE 130 performs high level management functions for system 100. For example, RE 130 communicates with other networks and systems connected to system 100 to exchange information regarding network topology. RE 130 may create routing tables based on network topology information, create forwarding tables based on the routing tables, and forward the forwarding tables to PFEs 110. PFEs 110 use the forwarding tables to perform route lookup for incoming packets. RE 130 may also perform other general control and monitoring functions for system 100.

PFEs 110 are each connected to RE 130 and switch fabric 120. PFEs 110 receive packet data on physical links connected to a network, such as a wide area network (WAN), a local area network (LAN), or another type of network. Each physical link could be one of many types of transport media, such as optical fiber or Ethernet cable. The data on the physical link is formatted according to one of several protocols, such as the synchronous optical network (SONET) standard, an asynchronous transfer mode (ATM) technology, or Ethernet.

A PFE 110 may process incoming packet data prior to transmitting the data to another PFE or the network. PFE 110 may also perform a route lookup for the data using the forwarding table from RE 130 to determine destination information. If the destination indicates that the data should be sent out on a physical link connected to PFE 110, then PFE 110 prepares the data for transmission by, for example, adding any necessary headers, and transmits the data from the port associated with the physical link. If the destination indicates that the data should be sent to another PFE via switch fabric 120, then PFE 110 prepares the data for transmission to the other PFE, if necessary, and sends the data to the other PFE via switch fabric 120.

Figure 2:
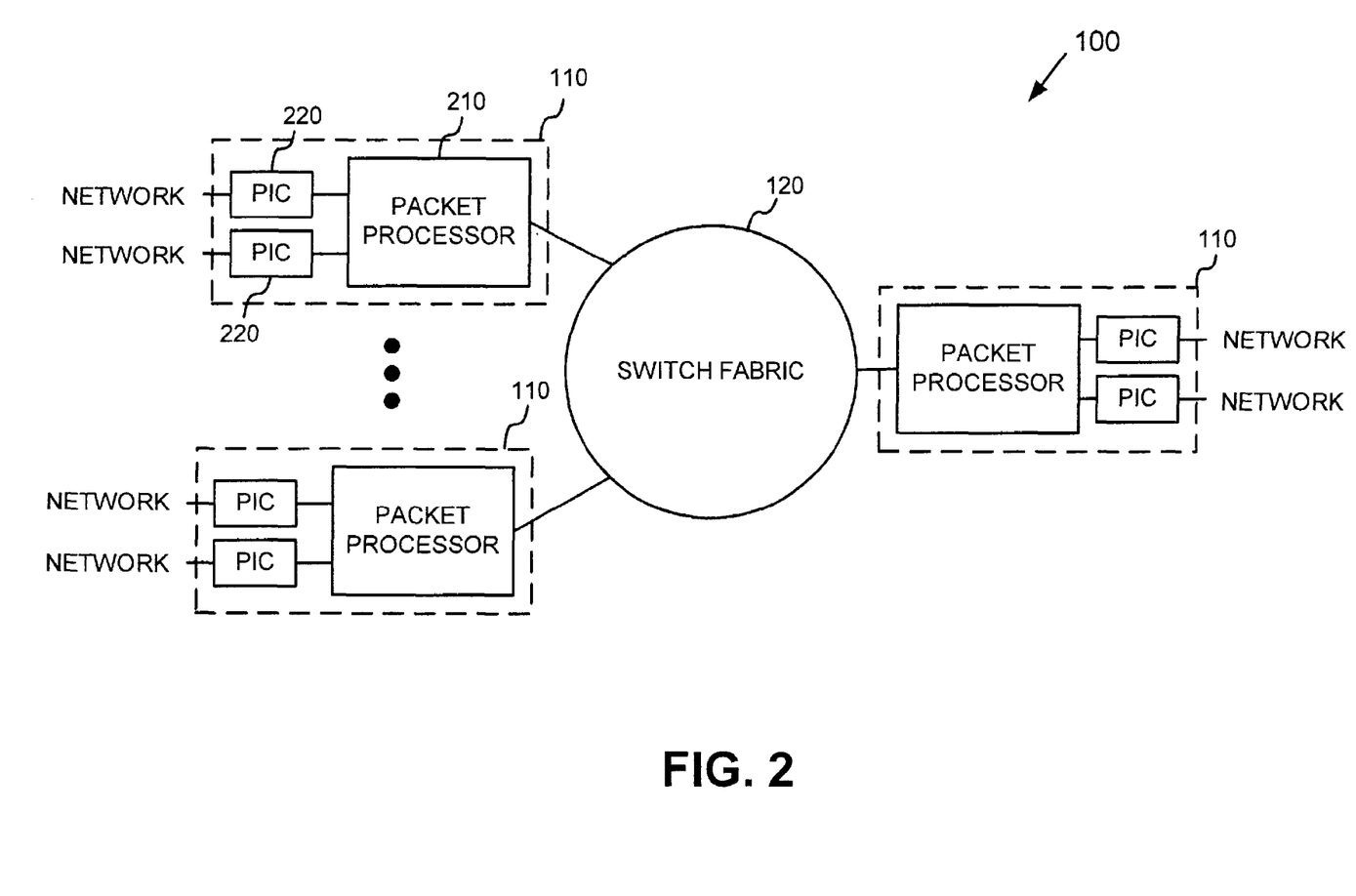
FIG. 2 is a detailed block diagram illustrating portions of the routing system of FIG. 1.

FIG. 2 is a detailed block diagram illustrating portions of routing system 100. PFEs 110 connect to one another through switch fabric 120. Each of PFEs 110 may include one or more packet processors 210 and physical interface cards (PICs) 220. Although FIG. 2 shows two PICs 220 connected to each of packet processors 210 and three packet processors 210 connected to switch fabric 120, in other embodiments consistent with principles of the invention there can be more or fewer PICs 220 and packet processors 210.

Each of packet processors 210 performs routing functions and handles packet transfers to and from PICs 220 and switch fabric 120. For each packet it handles, packet processor 210 performs the previously-discussed route lookup function and may perform other processing-related functions.

PIC 220 may transmit data between a physical link and packet processor 210. Different PICs may be designed to handle different types of physical links. For example, one of PICs 220 may be an interface for an optical link while another PIC 220 may be an interface for an Ethernet link.

Figure 3:
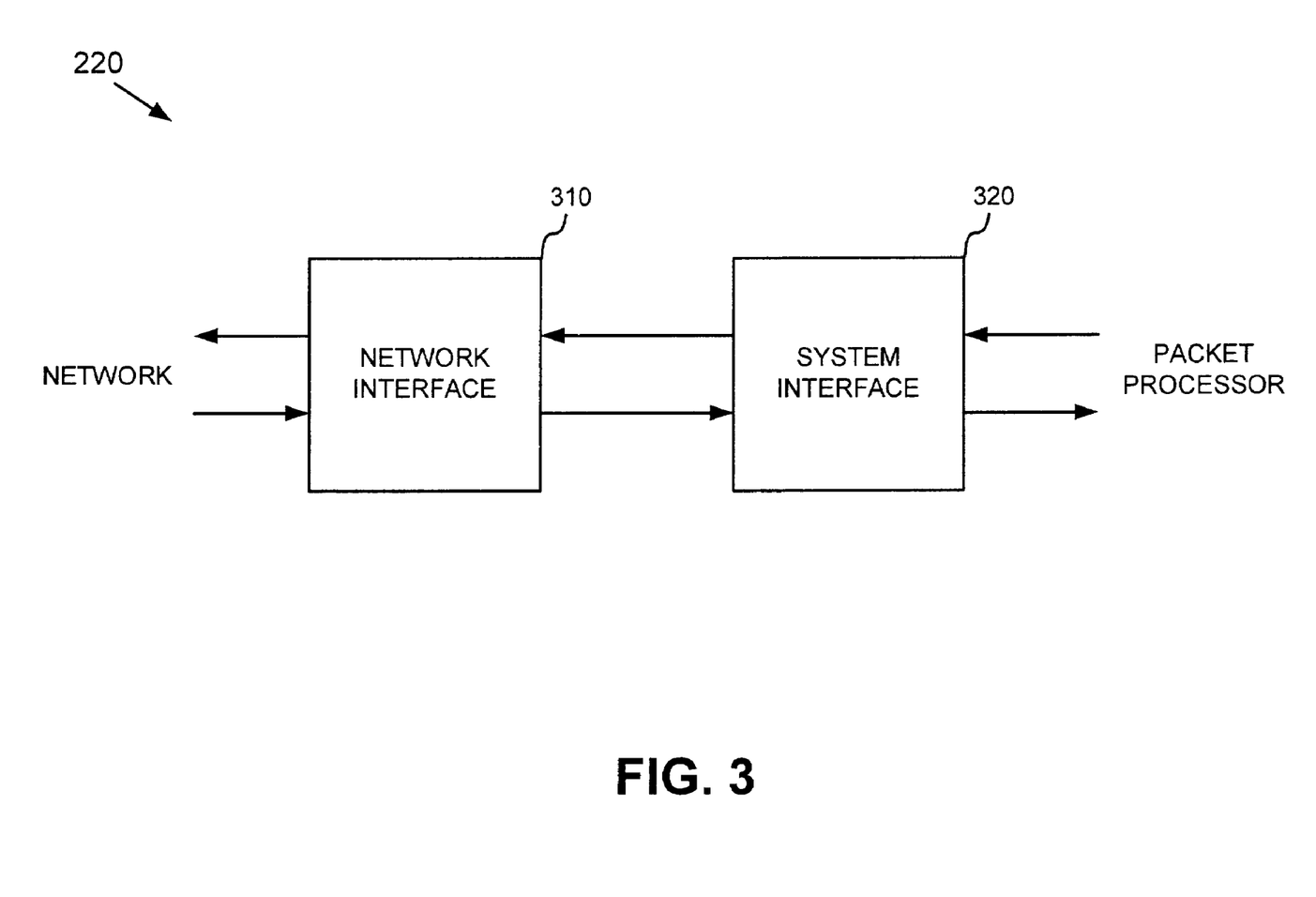
FIG. 3 is an exemplary diagram of a physical interface card of FIG. 2 according to an implementation consistent with the principles of the invention.

FIG. 3 is an exemplary diagram of a PIC 220 consistent with the principles of the invention. PIC 220 may include a network interface 310 and a system interface 320. While FIG. 3 shows network interface 310 and system interface 320 located entirely within PIC 220, in other implementations consistent with the principles of the invention, system interface 320 and/or network interface 310 may be located within packet processor 210.

Network interface 310 may connect to the physical link and system interface 320 may connect to packet processor 210. Network interface 310 may contain logic to receive and process multiple streams of packets for transmission to system interface 320 or the physical link. For example, network interface 310 may add L1 or L2 header information to a packet prior to transmitting the packet on the physical link.

System interface 320 may include logic to receive and process multiple streams of packets for transmission to network interface 310 or packet processor 210. For example, system interface 320 may separate a packet into data units used by packet processor 210.

Figure 4:
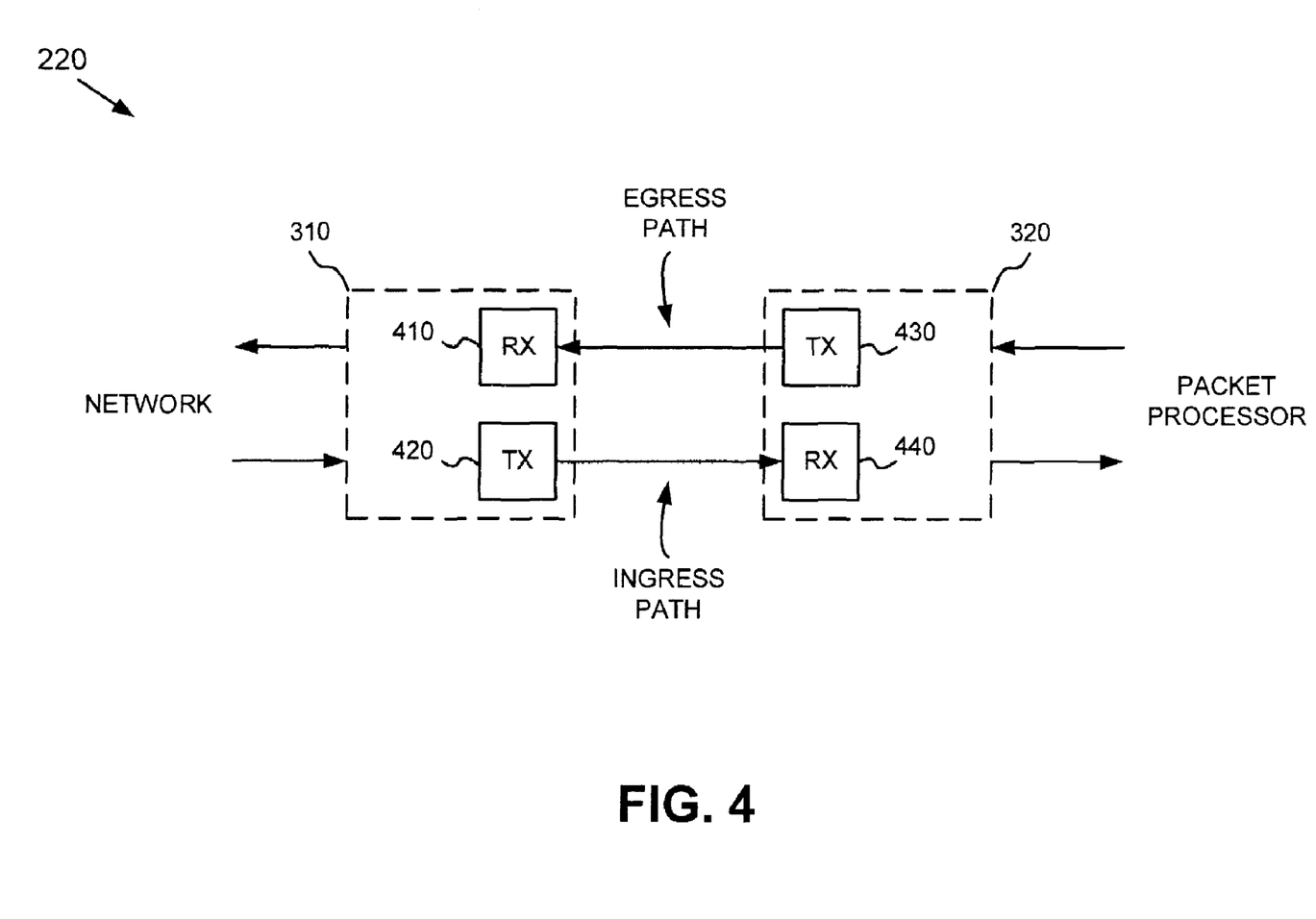
FIG. 4 is an exemplary detailed diagram of portions of the network interface and the system interface of FIG. 3 in an implementation consistent with the principles of the invention.

FIG. 4 is an exemplary detailed diagram of portions of network interface 310 and system interface 320 in an implementation consistent with the principles of the invention. Network interface 310 may include receiver (RX) 410 and transmitter (TX) 420. System interface 320 may include transmitter (TX) 430 and receiver (RX) 440.

Transmitter 430 and receiver 410 may be located along an egress path from packet processor 210 to the physical link. Transmitter 420 and receiver 440 may be located along an ingress path from the physical link to packet processor 210. The buses connecting transmitter 430 and receiver 410, and transmitter 420 and receiver 440 may each include a conventional type of high speed bus, such as a PL4, PL3, PL2, L2, L1, ATM, PCI (Peripheral Component Interconnect), SPI4 (System Packet Interface Level 4), Utopia, or another type of bus. In one implementation consistent with the principles of the invention, the high speed buses include 16-bit buses operating at a frequency greater than 500 MHz (e.g., 700 MHz).

Figure 5:
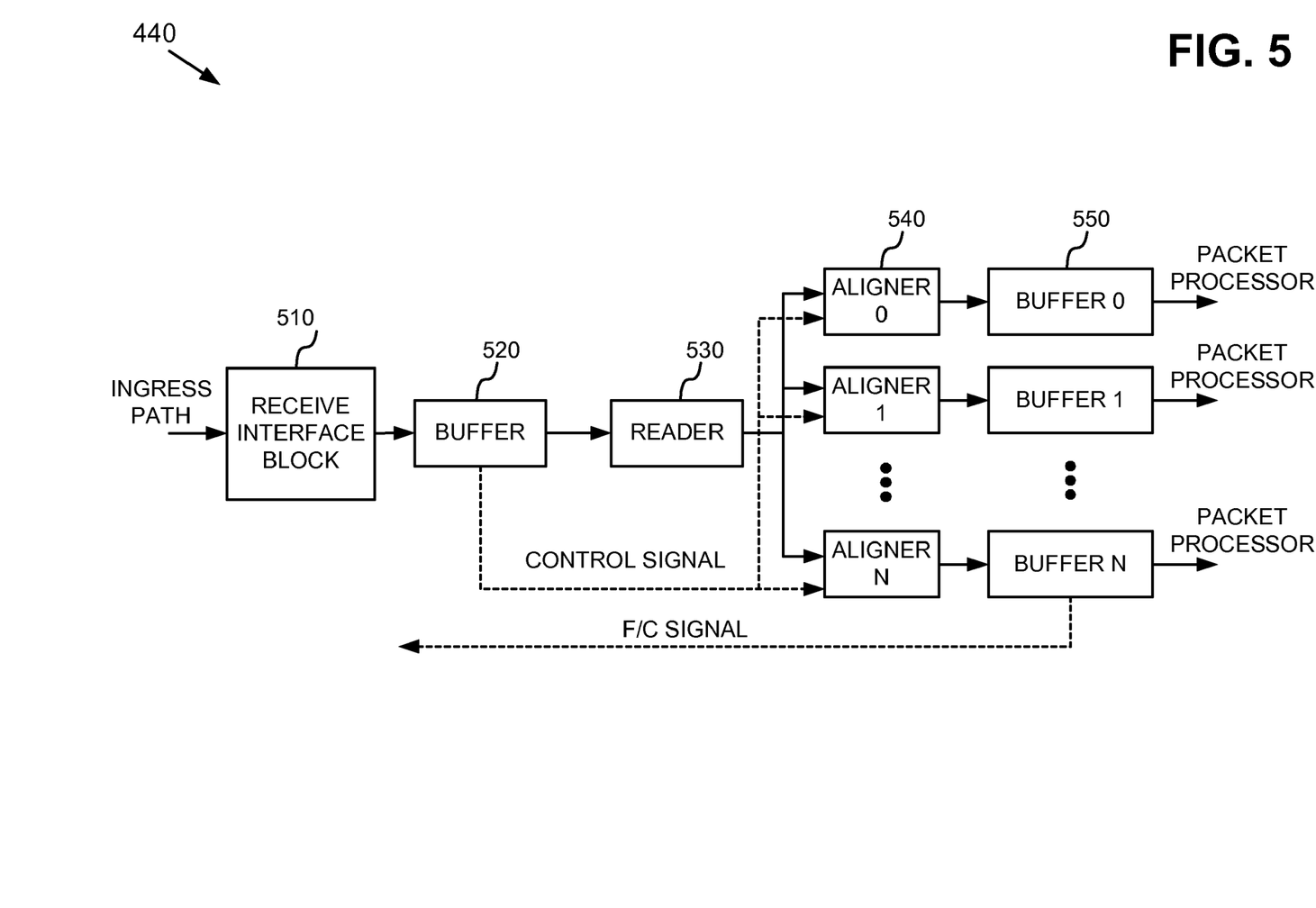
FIG. 5 is an exemplary diagram of a receiver of FIG. 4 according to an implementation consistent with the principles of the invention.

FIG. 5 is an exemplary diagram of a portion of receiver 440 according to an implementation consistent with the principles of the invention. Receiver 440 may receive multiple (N) time-multiplexed streams of data, where N≧1, and separate and output the streams.

As shown in FIG. 5, receiver 440 may include receive interface block 510, buffer 520, reader 530, aligner units 540, and buffers 550. Receive interface block 510 may include an asynchronous interface that receives time-multiplexed streams of data from a narrow, fast bus (e.g., 16 bit-wide, 700 MHz bus). Receive interface block 510 may process the data and output time-multiplexed streams of data on a wide, slower bus (e.g., 128 bit-wide, 87.5 MHz bus). In one implementation, the data may include control words that, for example, indicate to which stream the data belongs and identify the start and end of a packet of data.

Figure 6:
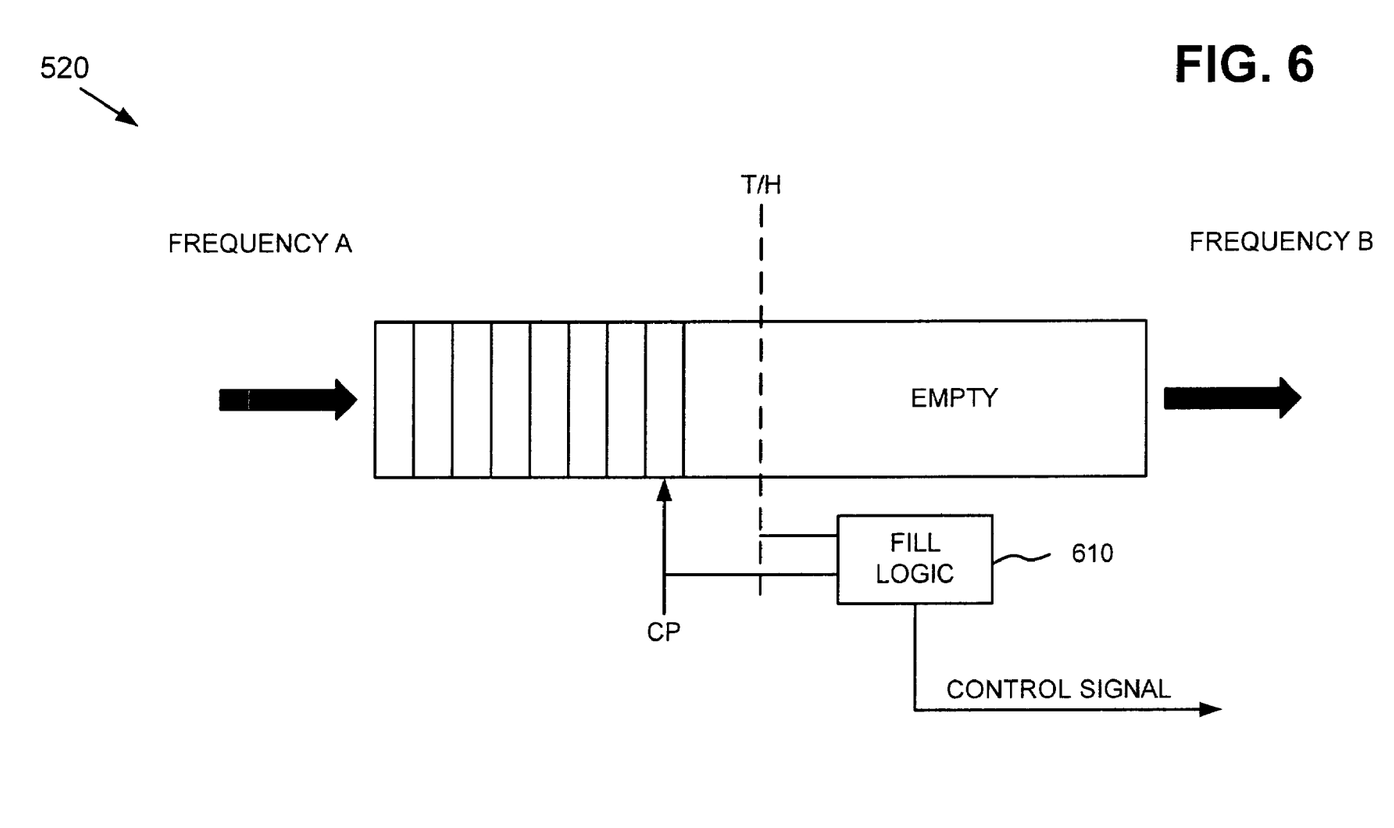
FIG. 6 is an exemplary diagram of a buffer of FIG. 5 according to an implementation consistent with the principles of the invention.

Buffer 520 may include a unified asynchronous buffer, such as a FIFO memory, that can be read and written independently. Buffer 520 may temporarily store the time-multiplexed streams of data from receive interface block 510 as 16 byte frames. FIG. 6 is an exemplary diagram of buffer 520 according to an implementation consistent with the principles of the invention. Buffer 520 creates a boundary between two clock domains. For example, buffer 520 may be written at a frequency A and read at a frequency B, where frequency A<frequency B. In one implementation, frequency A is equal to 87.5 MHz and frequency B is equal to 125 MHz.

In theory, buffer 520 is written every clock cycle. Because the data is normally written to buffer 520 at a much slower frequency than it is read, buffer 520 may typically have enough space to store incoming 16 byte frames. The faster frequency B permits aligners 540 to use an extra clock cycle (stall) when aligning data (the aligning function is described in more detail below). In other words, buffer 520 may be written every clock cycle (in the frequency A domain) and read every one or two clock cycles (in the frequency B domain).

A problem that might result when writing several small packets, such as packets that contain between 17 and 31 bytes, from the same stream into buffer 520 and taking an extra clock cycle to align the packets is that buffer 520 may fill and, possibly, overflow. This may occur when aligning too often, such as on every clock cycle, thereby using two clock cycles for every read from buffer 520 (i.e., stalling 50% of the time). Because of the stalling, it would be the equivalent to operating at an 87.5 MHz clock to write to buffer 520 and a 62.5 MHz clock to read from buffer 520.

To resolve this problem, buffer 520 may include a threshold (T/H) that is used to prevent buffer 520 from overflowing. If buffer 520 has a size Y, then the threshold value is set such that T/H<Y. In an alternate implementation, high and low watermarks (or thresholds) may be used. Buffer 520 may also include a current pointer (CP) that identifies the next data to be read from buffer 520.

Buffer 520 may further include fill logic 610. Fill logic 610 may compare the current pointer to the threshold value at every clock cycle (read and/or write). If the current pointer is greater than the threshold value, fill logic 610 may assert a control signal that it sends to aligners 540. The control signal indicates to aligners 540 that no aligning (or stalling) is to occur. In other words, when the current pointer is greater than the threshold value, data is read from buffer 520 every clock cycle. Because this reading occurs at a higher frequency (i.e., frequency B) than the writing (i.e., frequency A), buffer 520 will not overflow. In this case, the control signal may be considered to perform a forward flow control function.

Returning to FIG. 5, reader 530 may read data from buffer 520 and separate the data into respective streams. Reader 530 may provide the data to respective ones of aligners 540. Aligners 540 may include N aligners that correspond to the N data streams. Each of aligners 540 may, if necessary, align the data in the corresponding stream at the packet boundaries. Not all data will require aligning by aligner 540. In one implementation, only packets that are not multiples of 16 bytes may require aligning. In other implementations, other packet sizes may be used.

Figure 7:
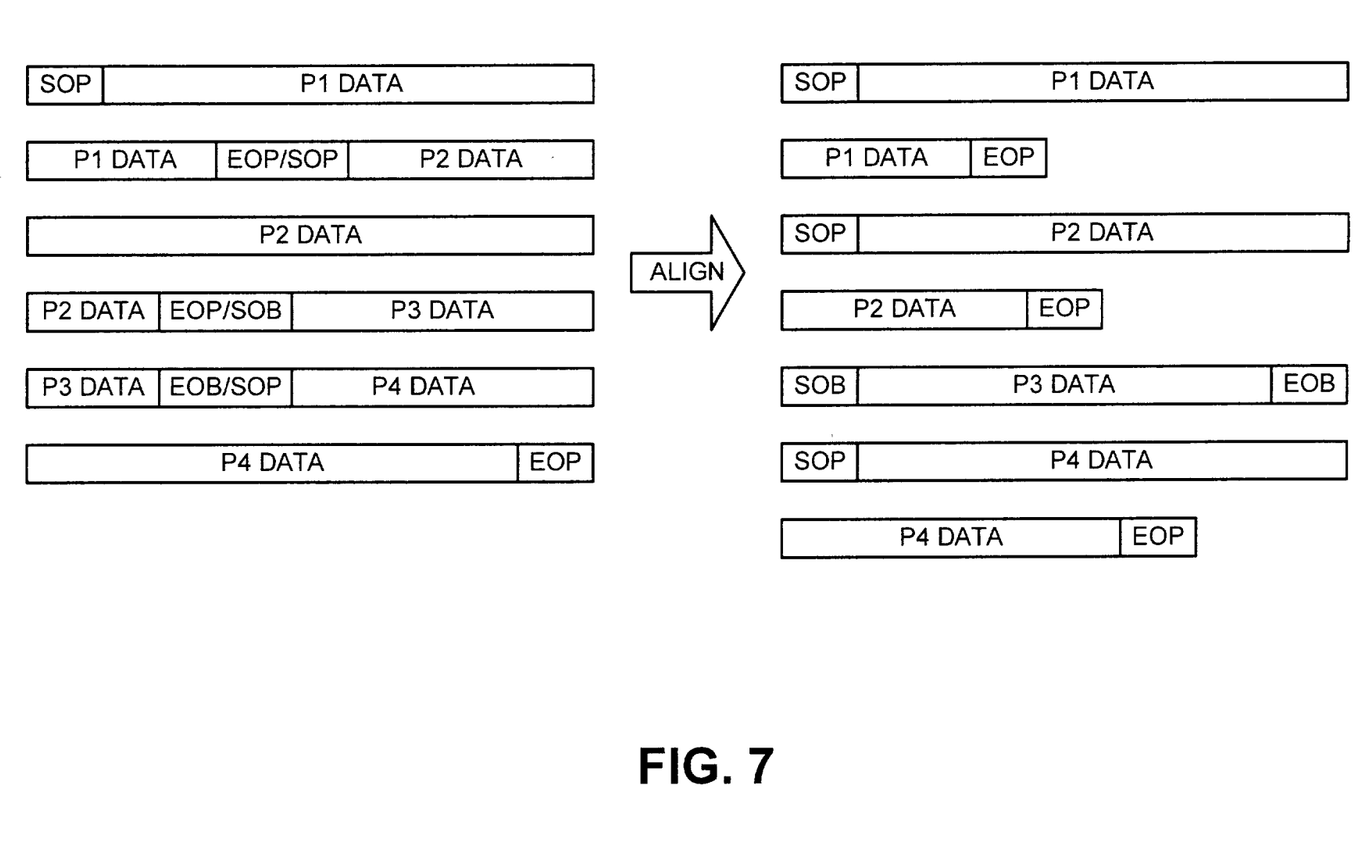
FIG. 7 is a diagram of an exemplary aligning function according to an implementation consistent with the principles of the invention.

FIG. 7 is a diagram of an exemplary aligning function according to an implementation consistent with the principles of the invention. As shown at the left side of the figure, packet data may begin with a start of packet (SOP) and end with an end of packet (EOP). Alternatively, a packet burst may begin with a start of burst (SOB) and end with an end of burst (EOB). The alignment function aligns the data at the packet boundaries, as shown at the right side of the figure.

Returning to FIG. 5, when aligner 540 performs the aligning function, aligner 540 stalls and may send a stall signal (not shown) back to reader 530. When this happens, reader 530 does not read data from buffer 520. If aligner 540 receives the control signal from buffer 520, aligner 540 may drop the packet data that it is currently aligning and read data from the next packet in buffer 520. Aligner 540 may write the data to buffer 550.

Buffers 550 may include N buffers that correspond to the N data streams. Each of buffers 550 may include a FIFO memory, or the like, that temporarily buffers data from the corresponding stream. In one implementation, each buffer 550 is capable of storing 6 k bytes of data. Buffer 550 sends the data for eventual processing by packet processor 210.

Figure 8:
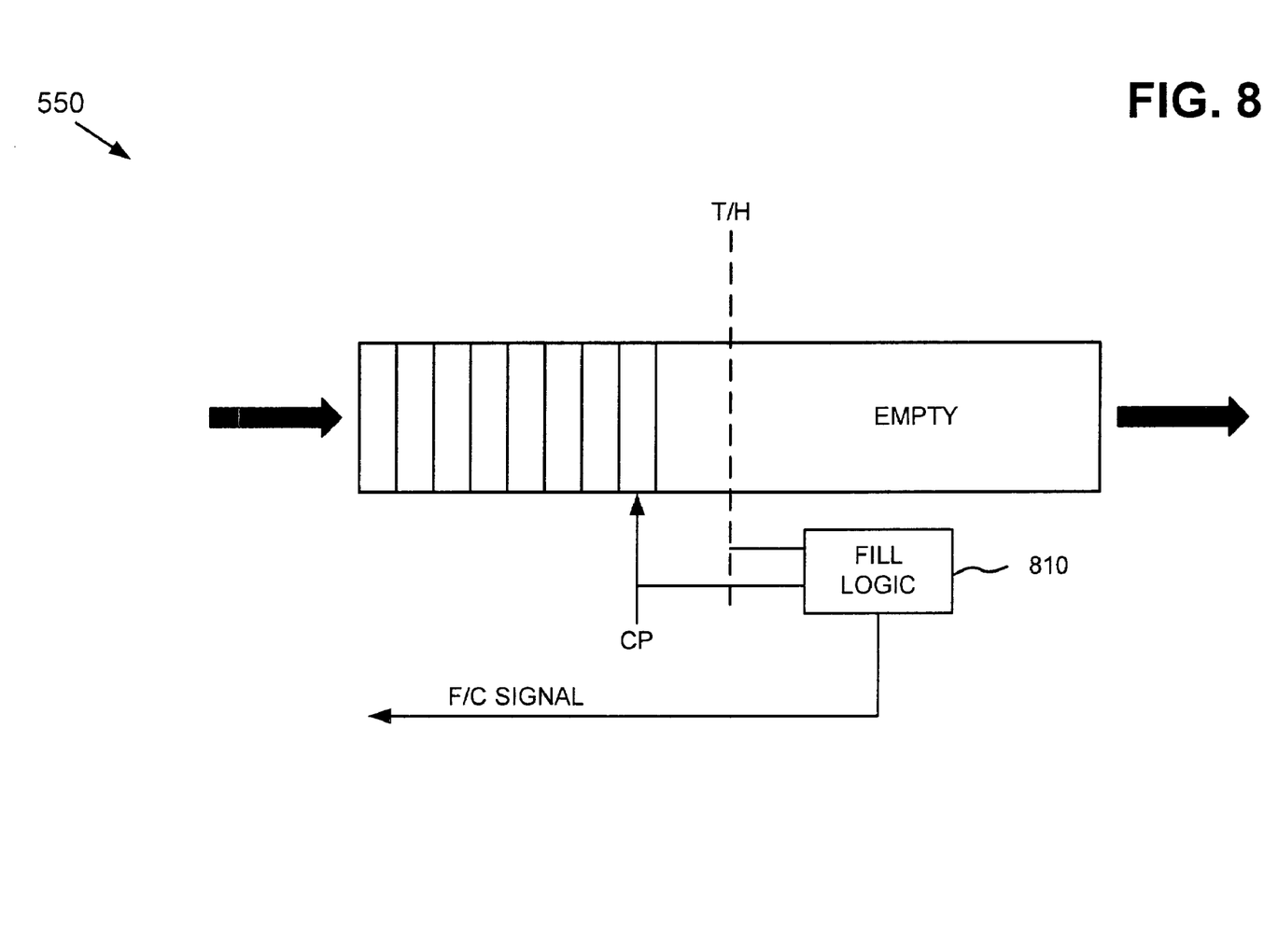
FIG. 8 is diagram of another buffer of FIG. 5 according to an implementation consistent with the principles of the invention.

FIG. 8 is diagram of a buffer 550 according to an implementation consistent with the principles of the invention. Buffer 550 may include a threshold (T/H) that is used to prevent buffer 550 from overflowing and provide per-stream flow control. If buffer 550 has a size Z, then the threshold value is set such that T/H<Z. In an alternate implementation, high and low watermarks (or thresholds) may be used. Buffer 550 may also include a current pointer (CP) that identifies the next data to be read from buffer 550.

Buffer 550 may further include fill logic 810. Fill logic 810 may compare the current pointer to the threshold value at every clock cycle (read and/or write). If the current pointer is greater than the threshold value, fill logic 810 may generate a flow control (F/C) signal that it sends to an upstream device, such as transmitter 420 (FIG. 4), which indicates to the upstream device to stop sending additional data for that stream. There is a latency between the time that buffer 550 sends the flow control signal and the time that the upstream device stops sending additional data. Therefore, the threshold value should be set such that buffer 550 does not overflow during this time period.

Exemplary Receiver Processing

Figure 9:
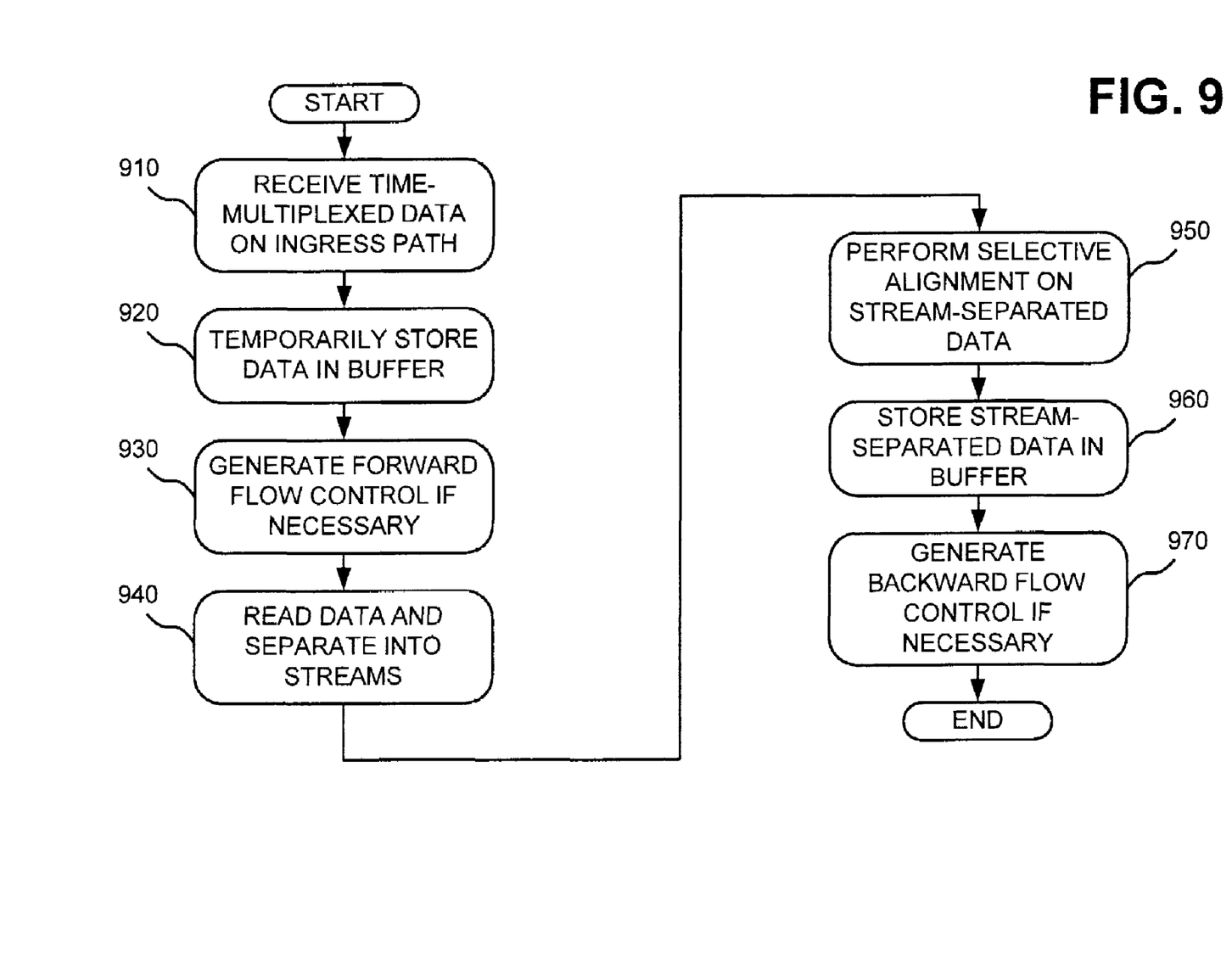
FIG. 9 is a flowchart of exemplary processing by a receiver of FIG. 4 according to an implementation consistent with the principles of the invention.

FIG. 9 is a flowchart of exemplary processing by receiver 440 according to an implementation consistent with the principles of the invention. Processing may begin with receive interface block 510 (FIG. 5) of receiver 440 receiving time-multiplexed streams of packet data (act 910). Receive interface block 510 may process the data between different clock domains. For example, receive interface block 510 may receive 16 bit, 700 MHz data and output 128 bit, 87.5 MHz data. Receive interface block 510 may write the data to buffer 520.

Buffer 520 may temporarily store the data from receive interface block 510 as 16 byte frames (act 920). As described above, buffer 520 may create a boundary between clock domains. For example, buffer 520 may be written at 87.5 MHz and read at 125 MHz. Because the writing to buffer 520 normally occurs at a slower rate than the reading from buffer 520, buffer 520 generally has the capacity to store the next data from receive interface block 510.

At some point, however, buffer 520 may begin to fill. This may occur, for example, when several small back-to-back packets, such as packets that contain between 17 and 31 bytes, from the same stream are written into buffer 520. In this case, aligner 540 may have to align packet data on every clock cycle, thereby using two clock cycles for every read from buffer 520. When this happens, buffer 520 may generate a control signal for forward flow control (act 930). Buffer 520 may compare the current pointer to the buffer threshold value at every clock cycle and generate the control signal when the current pointer is greater than the threshold value. In one implementation, buffer 520 sends the control signal to all of aligners 540. In another implementation, buffer 520 sends the control signal to fewer than all of aligners 540. This forward flow control reduces the chances that buffer 520 will overflow.

Reader 530 may read data from buffer 520 and separate the data into their respective streams (act 940). Reader 530 may then send the data to respective ones of aligners 540 based on the streams to which the data belongs. Aligners 540 may perform selective alignment on their respective stream-separated data (act 950). In one implementation, aligners 540 perform alignment at packet boundaries for packets that are not multiples of 16 bytes. When an aligner 540 receives the control signal from buffer 520 (meaning that the capacity of buffer 520 has exceeded its threshold value), aligner 540 stops any current alignment function and drops the packet that is currently being aligned. Aligner 540 then reads the next packet from buffer 520 via reader 530. Aligner 540 continues to read data from buffer 520 at every clock cycle until buffer 520 indicates there is no longer a need for forward flow control (possibly by de-asserting the control signal).

Aligners 540 store their stream-separated data in a respective one of buffers 550 (act 960). It may occur that a buffer 550 begins to fill. This may result from data being written to buffer 550 faster than data is being read from buffer 550. When the capacity of buffer 550 exceeds its threshold, buffer 550 may generate a flow control signal that it sends to an upstream device (e.g., transmitter 420) (act 970). This backward flow control signal indicates to the upstream device to stop sending additional data for that stream. As a result, buffer 550 can empty some of the data it stores. When the capacity of buffer 550 becomes less than the threshold, buffer 550 may indicate to the upstream device to recommence sending data for the stream.

CONCLUSION

Systems and methods consistent with the principles of the invention provide a multi-level buffering scheme to handle large amounts of buffering in a multi-stream environment. The multi-level buffering scheme includes a combination of a unified asynchronous primary buffer connected to stream-dedicated secondary buffers. The primary buffer performs forward flow control and the secondary buffers perform backward flow control to improve traffic flow and prevent head-of-line blocking.

A series of aligners connected between the primary and secondary buffers selectively align packet data based on the amount of data stored in the primary buffer. For example, when the amount of data in the primary buffer is greater than a threshold value, then the aligners stop aligning and read additional data from the primary buffer. Because the rate at which the aligners read data from the primary buffer is greater than the rate at which data is written into the buffer, the capacity of the buffer reduces, thereby preventing the buffer from overflowing.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, although described in the context of a routing system, concepts consistent with the principles of the invention can be implemented in any system, device, or chip that communicates with another system, device, or chip via one or more buses. Also, systems and methods consistent with the principles of the invention apply to single stream as well as multi-stream environments.

Also, while the features of FIGS. 5–8 have been described in the context of a receiver on the ingress path, these features might also be used by a receiver on the egress path.

In addition, systems and methods have been described as processing packets. In alternate implementations, systems and methods consistent with the principles of the invention may process other, non-packet, data.

Further, certain portions of the invention have been described as "logic" that performs one or more functions. This logic may include hardware, such as an application specific integrated circuit, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A receiver, comprising:
   a first buffer configured to:
      receive data in a plurality of streams from an upstream device,
      temporarily store the data, and
      assert a forward flow control signal when a capacity of the first buffer exceeds a first threshold value;
   a plurality of logic blocks corresponding to the plurality of streams and configured to:
      receive the data from the first buffer, and
      selectively process the data based on the forward flow control signal; and
   a plurality of second buffers corresponding to the plurality of logic blocks and configured to:
      temporarily store the data from the logic blocks,
      generate a backward flow control signal when a capacity of one of the second buffers exceeds a second threshold value, and
      send the backward flow control signal to the upstream device.

2. The receiver of claim 1, wherein the data from the upstream device includes time-multiplexed streams of data.

3. The receiver of claim 1, wherein the first buffer includes an asynchronous memory that creates a boundary between two clock domains.

4. The receiver of claim 1, wherein the first buffer is read at a faster rate than the first buffer is written.

5. The receiver of claim 1, wherein when asserting the forward flow control signal, the first buffer is configured to send the forward flow control signal to all of the logic blocks.

6. The receiver of claim 1, wherein the data includes packet data; and
wherein the logic blocks include aligners that are configured to align the packet data at packet boundaries.

7. The receiver of claim 1, wherein when selectively processing the data, the logic blocks are configured to:
not process the data when the forward flow control signal is asserted, and
read additional data from the first buffer.

8. The receiver of claim 7, wherein when not processing the data, the logic blocks are configured to drop data currently being processed.

9. The receiver of claim 7, wherein when reading additional data, the logic blocks are configured to:
continue to read data from the first buffer at a predetermined rate until the first buffer de-asserts the forward flow control signal.

10. The receiver of claim 1, further comprising:
a reader configured to:
read the data from the first buffer,
separate the data into respective ones of the plurality of streams, and
send the data to appropriate ones of the logic blocks.

11. The receiver of claim 1, wherein the backward flow control signal indicates to the upstream device to stop sending additional data for a corresponding one of the plurality of streams.

12. A system that receives data in one or more streams from an upstream device, comprising:
means for temporarily storing the data in a first buffer;
means for asserting a forward flow control signal when a capacity of the first buffer exceeds a first threshold value;
means for reading the data from the first buffer;
means for selectively processing, by a plurality of logic blocks, the data based on the forward flow control signal;
means for temporarily storing the data from the plurality of logic blocks in a corresponding plurality of second buffers;
means for generating a backward flow control signal when a capacity of one of the second buffers exceeds a second threshold value; and
means for sending the backward flow control signal to the upstream device.

13. A method for processing data, comprising:
receiving data in a plurality of streams from an upstream device;
writing the data to a first buffer at a first rate;
asserting a forward flow control signal when a capacity of the first buffer exceeds a first threshold value;
reading the data from the first buffer at a second rate;
selectively processing, by a plurality of logic blocks, the data based on the forward flow control signal;
temporarily storing the selectively processed data in a plurality of second buffers corresponding to the plurality of logic blocks;
generating a backward flow control signal when a capacity of one of the second buffers exceeds a second threshold value; and
sending the backward flow control signal to the upstream device.

14. The method of claim 13, wherein the data from the upstream device includes time-multiplexed streams of data.

15. The method of claim 13, wherein the first buffer includes an asynchronous memory, and
wherein the second rate is greater than the first rate.

16. The method of claim 13, wherein the plurality of second buffers correspond to the plurality of streams.

17. The method of claim 13, wherein the data includes packet data; and
wherein the selectively processing the data includes:
aligning the packet data at packet boundaries.

18. The method of claim 13, wherein the selectively processing the data includes:
not processing the data when the forward flow control signal is asserted, and
reading additional data from the first buffer.

19. The method of claim 18, wherein the not processing the data includes:
dropping data currently being processed.

20. The method of claim 18, wherein the reading additional data includes:
continuing to read data from the first buffer at every clock cycle until the forward flow control signal is de-asserted.

21. The method of claim 13, further comprising:
separating the data from the first buffer into respective ones of the plurality of streams prior to selectively processing the data.

22. The method of claim 13, wherein the backward flow control signal indicates to the upstream device to stop sending additional data for a corresponding one of the plurality of streams.

23. A device that receives data in a plurality of streams, comprising:
a first buffer configured to:
store the data at a first rate, and
assert a forward flow control signal when a capacity of the first buffer exceeds a threshold value;
a plurality of logic blocks corresponding to the plurality of streams and configured to:
read the data from the first buffer at a second rate, and
selectively process the data based on the forward flow control signal; and
a plurality of second buffers corresponding to the plurality of logic blocks and configured to temporarily store the data from the logic blocks.

24. The device of claim 23, wherein the plurality of streams include time-multiplexed streams of data.

25. The device of claim 23, further comprising:
a reader configured to:
read the data from the first buffer,
separate the data into respective ones of the plurality of streams, and
send the data to appropriate ones of the logic blocks.

26. The device of claim 23, wherein one or more of the second buffers are further configured to:
generate a backward flow control signal when a capacity of the one or more second buffers exceeds a second threshold, and send the backward flow control signal to indicate to an upstream device to stop sending additional data in a corresponding one or more of the streams.

27. A network device, comprising:
a switch fabric; and
a plurality of forwarding engines coupled to the switch fabric, each of the forwarding engines including:
  a first buffer to:
    receive data in a plurality of streams from an upstream device,
    temporarily store the data, and
    assert a forward flow control signal when a capacity of the first buffer exceeds a first threshold value,
  a plurality of logic blocks, corresponding to the plurality of streams, to:
    receive the data from the first buffer, and
    selectively process the data based on the forward flow control signal, and
  a plurality of second buffers, corresponding to the plurality of logic blocks, to:
    temporarily store the data from the logic blocks,
    generate a backward flow control signal when a capacity of one of the second buffers exceeds a second threshold value, and
    send the backward flow control signal to the upstream device.

28. The network device of claim 27, wherein each of the forwarding engines further includes:
  a reader to separate the data from the first buffer into respective ones of the plurality of streams for use by the logic blocks.

* * * * *